Patented Sept. 9, 1930

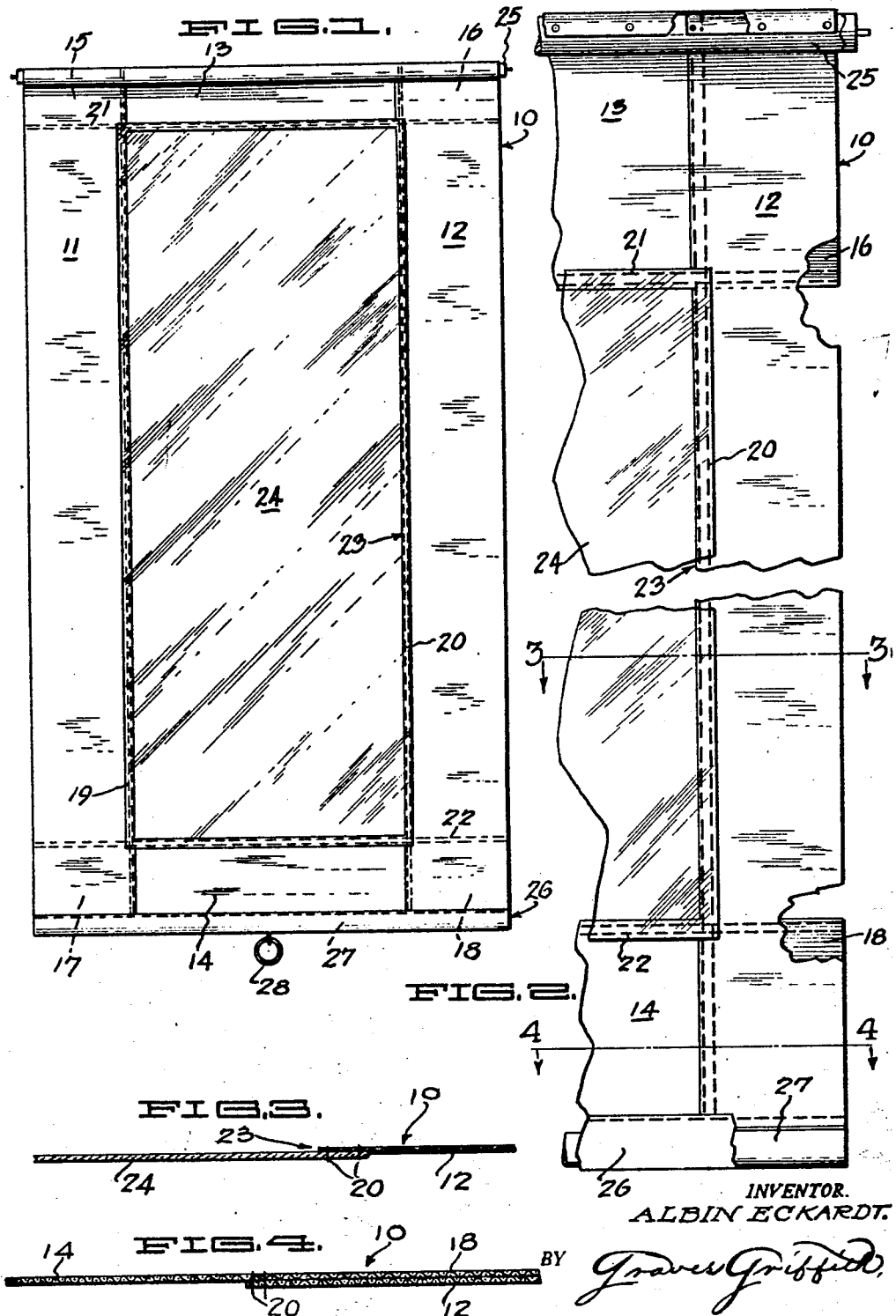

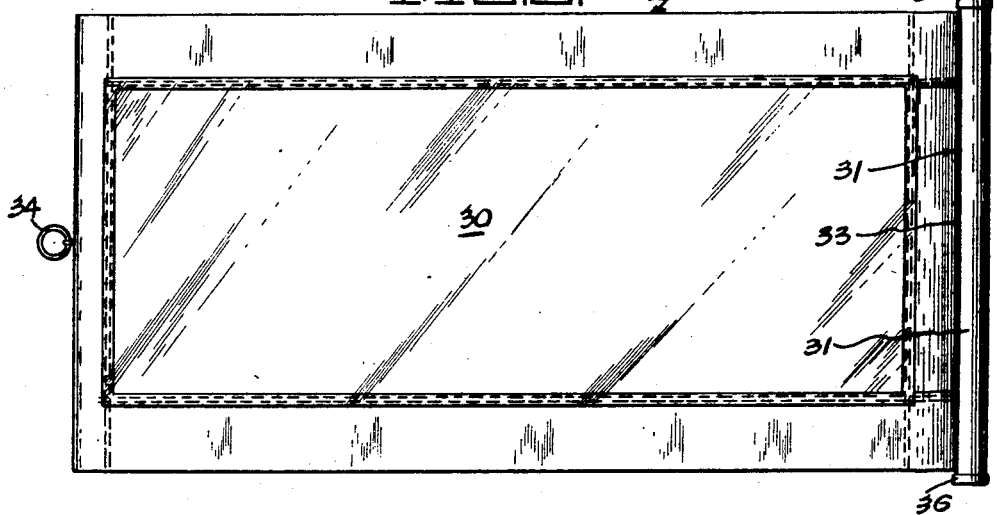

1,775,275

UNITED STATES PATENT OFFICE

ALBIN ECKARDT, OF SAN FRANCISCO, CALIFORNIA

COMBINATION SHADE AND RAY FILTER

Application filed January 24, 1929. Serial No. 334,774.

The present invention relates to combination window shades and ray-filters, and more particularly to those of such character and arrangement as will permit of the selection of a filter permitting passage therethrough of a ray of a color that will best serve for a required therapeutical treatment, or as a medium wherethrough light in passage may be largely deprived of its glare.

The therapeutical values of the different spectrum colors vary greatly, as does their "glare" properties, and the object of the invention primarily is to provide means for selectively screening out all rays but the one actually desired for a specific purpose and permitting passage to this particular ray, the screening out process also resulting in the production of a toned down color adapted to afford a light of a mild and soothing nature.

A further object of the invention is to provide a plurality of shades bearing individually a differently colored ray-filter and of such disposition as to permit of selectivity, and of a character and arrangement adapted for installation and use in residences, schools, hospitals, and sanatoriums, with a view of applying the curative properties of the spectrum colors therapeutically, or of so modifying them as to produce a softened diffused glow without entirely excluding all light, unless otherwise desired.

Additional to the foregoing is that of providing an opaque shade bearing as an insert a ray-filter member of flexible character and selected color adapted for rolling and unrolling, after the manner of the spring-controlled shade, and adaptable for use in connection with automobile windshields as an anti-glare element.

While the ordinary opaque window shade may be allowed to retain its place as a means for totally excluding exterior light from a room, its presence is entirely unnecessary, since any two filters of different colors when drawn in combination will serve that purpose equally well.

It may be observed in this connection that in instances where it is required that the ultra violet ray shade be used it will be necessary to raise the intervening window sash to permit the passage of these rays to the rayfilter medium, since ordinary glass acts as a screen to exclude them.

In the accompanying drawings, forming a part of this specification, and in which similar characters of reference denote like parts, throughout:

Figure 1 is an elevation, illustrating a shade provided with a centrally arranged colored insert, or ray-filter, of a flexible translucent or transparent material.

Figure 2 is an enlarged fragmentary view, illustrating the preferred method of constructing and reinforcing the opaque fabric portion of the combination to provide a rectangular opening therein for the accommodation of the translucent or transparent rayfilter, this being stitched, or otherwise secured, at all sides to the fabric opening in such wise as to afford a complete covering therefor of flexible, colored character;

Figure 3 is an enlarged sectional detail of a portion of the shade fabric and transparent ray-filter material, the view being indicated by the line 3—3 in Figure 2;

Figure 4 is an enlarged sectional detail taken on the line 4—4 in Figure 2 and showing the method of reinforcing the side strips of the shade;

Figure 5 is an elevation showing a modified form of shade for use in a horizontal position, the shade being unrolled from its housing and in position for use;

Figure 6 is an enlarged plan view, showing the roller housing illustrated in Figure 5;

Figure 7 is a side elevation illustrating a housing adapted for mounting upon the upper portion of any window frame and provided with a plurality of roller shades bearing ray-filters of different colors and arranged for selective actuation to bring any desired color screen, or ray-filter, or any desired combination thereof, into a position for screening a window; and Figure 8 is an enlarged vertical sectional detail of the roller housing and roller mounting shown in Figures 5 and 6, and indicated by the line 8—8 in Figure 6.

Referring with greater particularity to the drawings and particularly to Figures 1 and 2, in which the preferred embodiment of my invention has been shown, the numeral 10, in a general way, designates an opaque fabric shade portion constructed from the usual shade material and embodying side sections 11 and 12, top and bottom sections 13 and 14, and corner reinforcing strips 15, 16, 17 and 18, all securely and firmly stitched in overlapped relation by lines of vertical stitching 19 and 20, and upper and lower cross-line stitching 21 and 22, the whole forming an opaque portion bearing a centrally disposed rectangular opening 23 covered by an insert 24 of flexible transparent colored material.

The free edges of the insert 24 are securely stitched to the free edges of the fabric strips by means of the various double lines of stitching 19, 20, 21 and 22, the insert being preferably secured to the inside face of the shade, as shown, the whole, as thus constructed, being mounted upon the usual spring-controlled shade roller 25, which, in turn, is carried in suitable brackets, not shown.

The lower edge of the shade 10 is provided with the usual pocket 26, in which is mounted the wooden reinforcing strips 27 provided with a centrally disposed ring 28, for convenience in rolling the shade up or down upon its roller.

In Figure 5, a shade 29 of similar character but of somewhat narrower form than that of shade 10 has been shown, embodying in this, as in the preferred form, a rectangular ray-filter 30 as an insert within the opaque fabric body of the shade, this form being of a character adaptable for mounting in a horizontal position and provided with a metallic housing 31, in which is mounted the roller 32. The housing 31, as shown in Figures 5, 6 and 8, comprises a tubular member having an elongated slot 33 providing an aperture through which the shade may be drawn by the ring 34, this member, or housing, being further provided with an upper removable cap 35 and a lower fixed cap 36, the upper of these having a central bearing member 37 provided with a rectangular opening therein to receive the squared spindle 38 of the spring roller 32, and the lower one with a bearing member 39 provided with a bearing opening therein to receive the round spindle 40 of the roller, the housing, as thus formed, having fixed brackets 41 mounted thereon, as shown in Figure 6, to provide means for its rigid attachment in vertical position to any window frame without disfigurement thereto.

The shade shown in Figures 5, 6, 7 and 8 is constructed as the exact counterpart of that shown and described in Figures 1 to 4 inclusive, except in that the combination, both as to shade and ray-filter, are of somewhat lessened dimensions.

The ray-filter most commonly employed, where the intent is to remove the glare from strong lights, would be one comprising an amber color, since this is of greater efficiency than others in screening out the more trying of the sun's rays.

It is obvious that various colored ray-filters may be used, if desired, as is shown in Figure 7, where a number of shades are hung in parallel relation and mounted in a suitable housing 42 carried by the upper plate of the window frame in such manner as to permit of selective use, a plurality of shades 43, 44, 45, 46, 47 and 48 being shown as thus arranged, with their ray-filters respectively constituted of different spectrum colors, an arrangement permitting the utilization of any desired color, or in combination of twos, the exclusion of all colors.

While in the present construction the opaque body portion of the shade is described as being of the ordinary textile fabric character commonly employed in the making of window-shades, and the ray-filter of a transparent material of pyralin or like substance, it is not the intent in either instance to be so restricted, as it is obvious that any flexible opaque material adaptable for rolling may be made use of in the former, and any flexible colored transparent material in the latter; nor do these elements necessarily need to be secured together by stitching, since it is equally obvious that this securement may be obtained through cementitious means.

Having thus described my invention, I claim, and desire to secure by Letters Patent:

1. As an article of manufacture, a spring-controlled roller, an opaque shade having one edge attached to said roller, a rectangular opening formed in said shade, reinforcing corner strips therefor double stitched to the shade, and a ray-filter covering said opening, with its outer edges stitched to the free edges of said opening, said ray-filter comprising a sheet of transparent colored material.

2. As an article of manufacture, in combination, a spring-controlled roller, an opaque shade depending therefrom, said shade embodying side strips of reinforcing character forming a centrally disposed rectangular opening therein, corner reinforcing strips stitched to said side strips, and a flexible sheet of transparent colored material having its free edges secured to the inner edges of said opening to form an integral part of said shade.

3. As an article of manufacture, in combination, a spring-controlled roller, an opaque shade having one edge secured to said roller, said shade embodying side, top and bottom strips and reinforcing corner strips providing a centrally disposed opening therein, and a ray-filter covering said opening, with its free edges stitched to the free edges of said side, top and bottom strips, said filter consisting of a flexible sheet of transparent colored material.

4. In a device of the character described, the combination with a spring-controlled roller, of an opaque shade depending from said roller comprising side strips and cross strips having reinforcing corner strips and forming a reinforced framed opening therein, the said side, cross and corner strips being all securely stitched together, and a ray-filter covering said framed opening comprising a sheet of flexible transparent colored material having its free edges stitched to the free edges of said side and cross strips.

In testimony whereof I hereunto affix my signature.

ALBIN ECKARDT.